Inventor:
David C. Rockola
By: Horton, Davis, Brewer & Brugman
Attys.

July 10, 1962 D. C. ROCKOLA 3,043,597
AUTOMATIC PHONOGRAPH
Filed Sept. 14, 1959 7 Sheets-Sheet 2

July 10, 1962

D. C. ROCKOLA

3,043,597

AUTOMATIC PHONOGRAPH

Filed Sept. 14, 1959

Inventor:
David C. Rockola
By: Horton, Davis, Brewer & Brugman
Attys.

United States Patent Office 3,043,597
Patented July 10, 1962

3,043,597
AUTOMATIC PHONOGRAPH
David C. Rockola, Chicago, Ill., assignor to Rock-Ola Manufacturing Corporation, Chicago, Ill., a corporation of Delaware
Filed Sept. 14, 1959, Ser. No. 839,725
15 Claims. (Cl. 274—10)

The present invention relates to automatic phonographs and more particularly to a program holder in an automatic phonograph, and other parts related to the program holder.

The program holder of the present invention is adapted to releasably hold a program tab, or record tab, for each of the plurality of records that can be accommodated in the magazine of the phonograph, to identify to the patron playing the phonograph each of the records, and each side of each one thereof, in the phonograph, and to serve as a component in control means by which the patron is enabled to play the desired records.

A principal object of the invention is to provide a program holder in an automatic phonograph and means therein for mounting it for easy removal of a portion of it by a service man, to facilitate removal and replacement of program tabs therein corresponding to removal and replacement of records in the magazine of the phonograph which they identify.

Another object is to provide a program holder in an automatic phonograph, having a plurality of program tabs corresponding to records in the magazine of the phonograph, in which only a group which is less than all of the program tabs therein are presented at one time to view to a patron of the phonograph, and which has a movable drum for successively presenting different groups of the program tabs to view, wherein the drum moves to position for presenting a selected group to view, in response to actuation of a control means by a patron, regardless which position it occupied prior to that actuation.

A further object is to provide, in an automatic phonograph having a magazine movable to different positions in the operations of making selections of records in the magazine, a program holder having a drum which is movable to different positions in the manner hereinabove stated, and driving means is provided for moving the magazine which is controlled by the position of the drum, wherein the program holder includes mounting means for the drum, and the mounting means and drum are of novel construction such as to enable removal of the drum from the mounting means and replacement therein, and further wherein the drum can assume only a single position relative to the mounting means, whereby to assure accurate control of movements of the magazine according to the position of the program holder.

Another object is to provide a novel program holder drum the major portion of which is made up of a plurality of substantially identical sections whereby to facilitate fabrication thereof, and whereby to readily adapt it to fabrication by molding operations as when it is made of plastic material, as is preferable.

A further object is to provide a program holder for an automatic phonograph, for holding program tabs for identifying records in the phonograph, having novel construction for releasably securing the tabs in place whereby to facilitate removal of the tabs from the holder and insertion therein.

Other objects and advantages of the invention will appear from the following detailed description taken in conjunction with the accompanying drawings in which.

Figure 1:
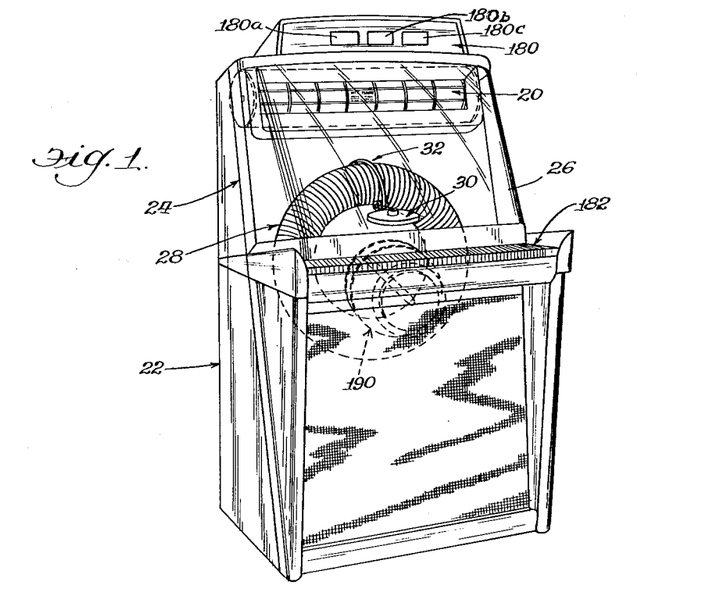
FIGURE 1 is a perspective view of an automatic phonograph in which the program holder of the present invention is incorporated.

Referring in detail to the drawings, the phonograph illustrated in FIGURE 1 is selected as one form of phonograph in which the removable program holder of the present invention may be incorporated. The program holder of the present invention is indicated in its entirety at 20 in FIG. 1, disposed for observance by the public and for such purpose is disposed adjacent the top of the cabinet of the phonograph at a height approximating eye level. The phonograph includes the cabinet indicated at 22 which, in turn, includes an upper portion 24 mounted for swinging movements between open and closed positions. When the portion 24 is in its closed position, the program holder is observable through the front transparent panel 26, and when this portion is open, as in FIG. 2, the program holder is exposed to the exterior of the phonograph for easy access by the service man who can remove the drum thereof in a manner described in detail hereinbelow.

The automatic phonograph illustrated herein and utilized as an example of device incorporating the program holder, includes other operating parts, such as a record magazine 28, a turntable 30 and record transfer means 32, these main parts being shown and described in detail in my prior Patent No. 2,804,307, issued August 27, 1957. The program holder of the present invention is correlated with these other parts of the phonograph in such a manner that selection of the records in the magazine 28, and the playing thereof, is made according to the position of the program holder.

As set out more fully in the above-mentioned patent, the record transfer means 32 grips a record in one of the pockets of the magazine, and removes it from the magazine and places it on the turntable 30. Then the playing mechanism operates and after completion of playing the record, the transfer mechanism 32 grips the record on the turntable and replaces it in the pocket of the magazine from which it was removed. The program holder is provided with means for holding identification tabs which correspond to predetermined pockets of the magazine, and are positioned for easy reading by the player of the phonograph.

Figure 3:
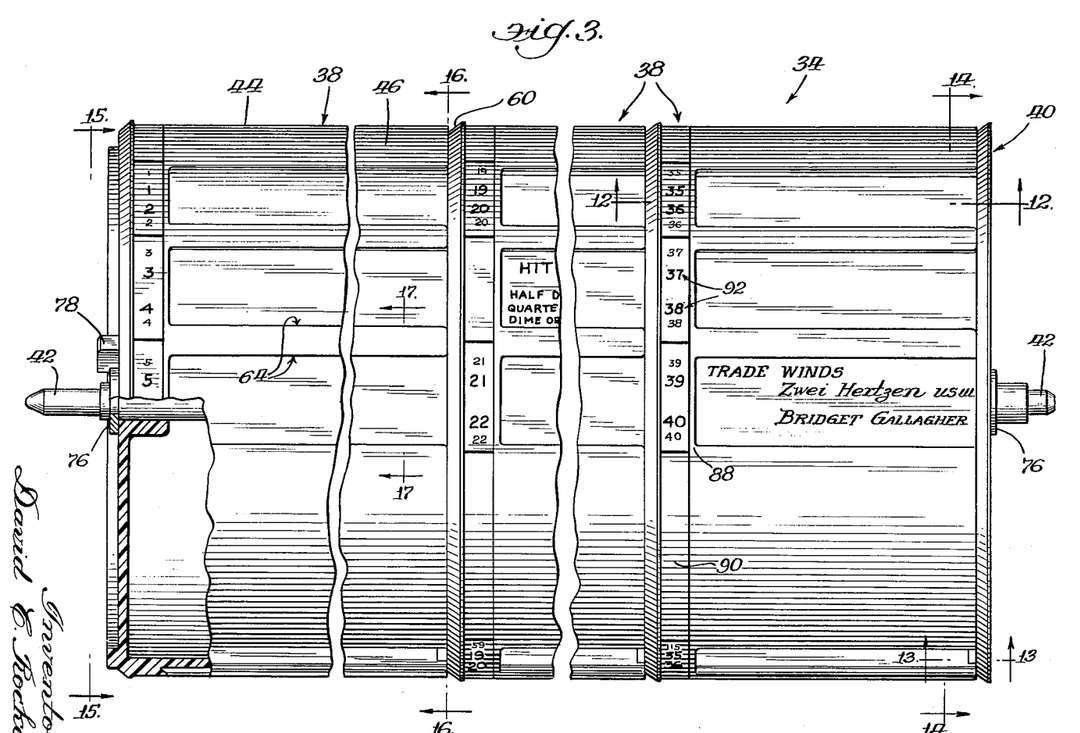
FIG. 3 is a view principally in elevation but partially in section, on an enlarged scale, of the drum portion of the program holder.
Figures 4, 5, 6, 7:
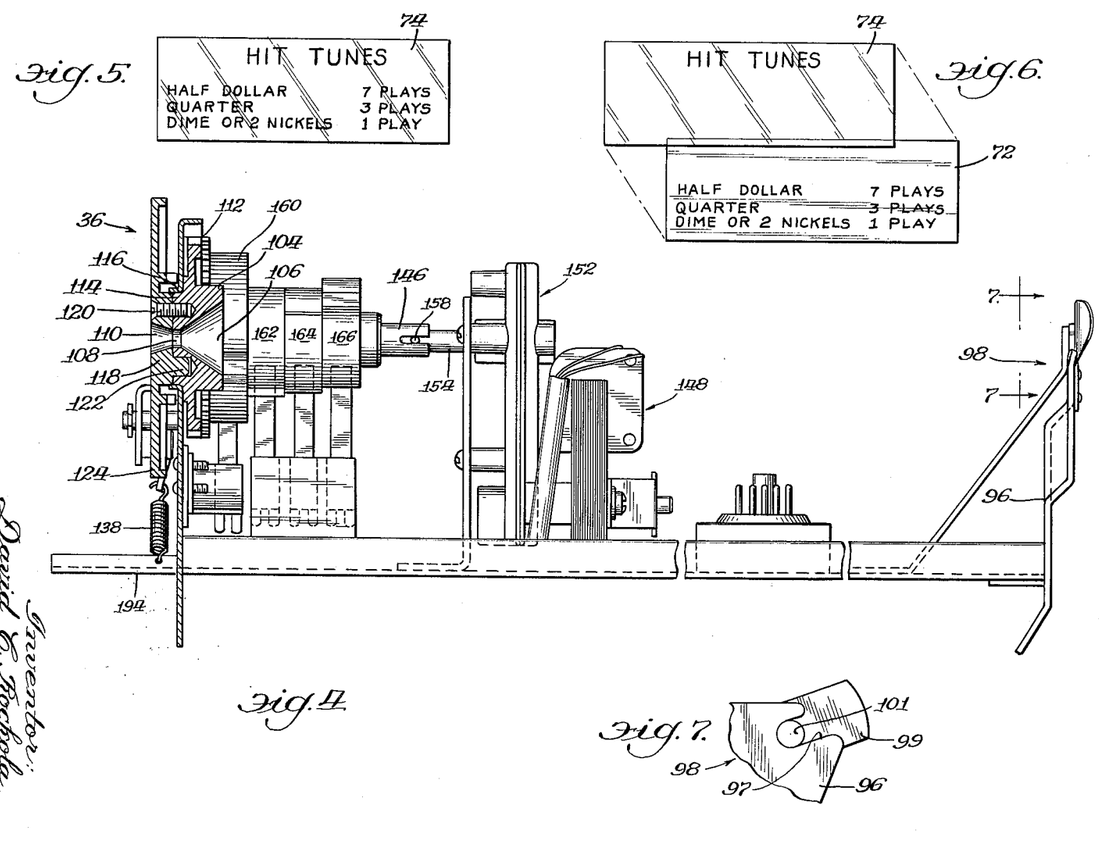
FIG. 4 is a front view of the mounting means portion of the program holder, which supports the drum.
FIG. 5 is a plan view of an assemblage of program tabs.
FIG. 6 is a view showing the tabs of FIG. 5 in separated or exploded view.
FIG. 7 is a detail view, taken on line 7—7 of FIG. 4, showing a detail of one of the socket members for supporting the drum.
Figures 8, 9:
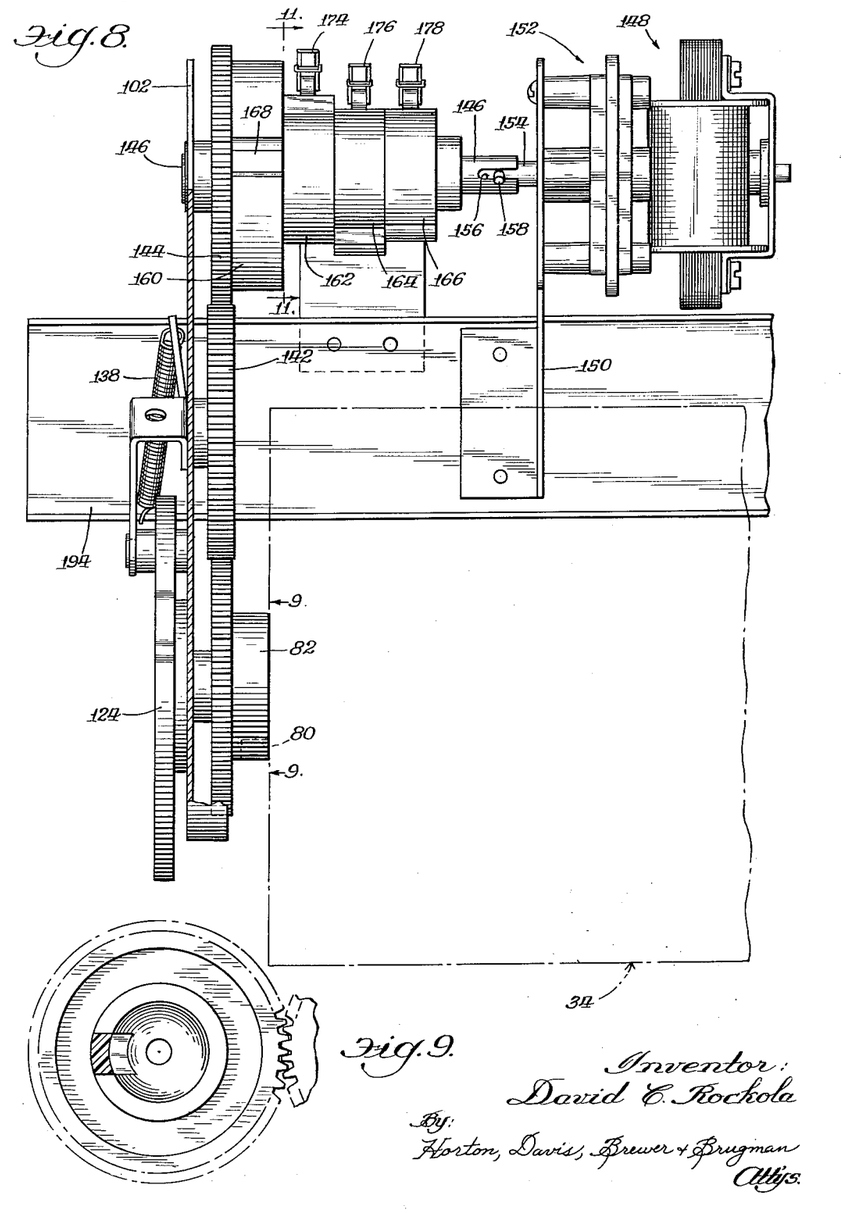
FIG. 8 is a plan view of the left-hand portion of the mounting means of FIG. 4, showing the drum in dot-dash lines.
FIG. 9 is a detail view taken on line 9—9 of FIG. 8, showing the other of the socket members for supporting the drum.
Figures 10, 11:
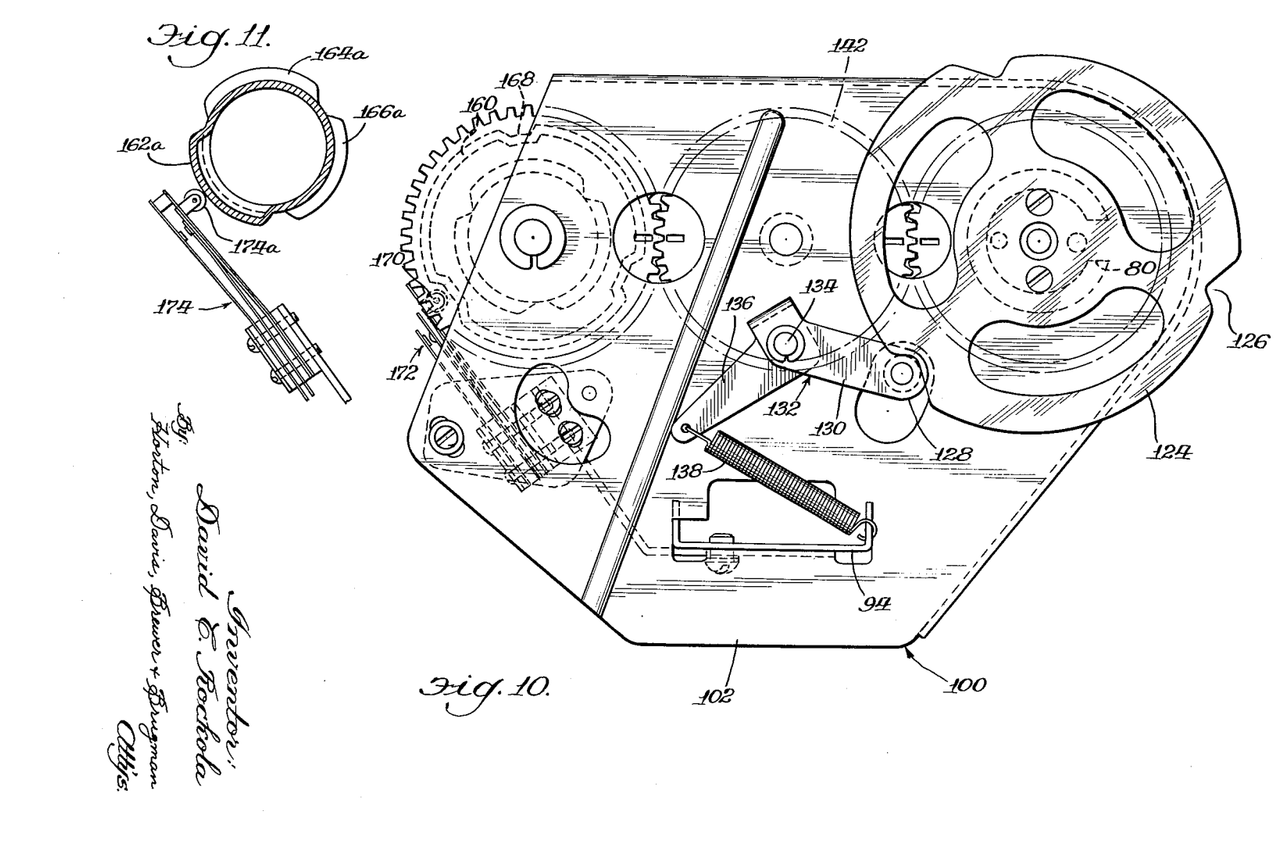
FIG. 10 is an end view of the mounting means of FIGS. 4 and 8, taken from the left of FIGS. 4 and 8.
FIG. 11 is a view taken at line 11—11 of FIG. 8.

The program holder 20 includes two principal parts, namely, the drum 34, shown as a whole in FIG. 3, and the mounting means 36 therefor, of FIGS. 4, 8 and 10. A detailed description of the drum 34 will first be given, to be followed by a detailed description of the mounting means 36.

Figure 15:
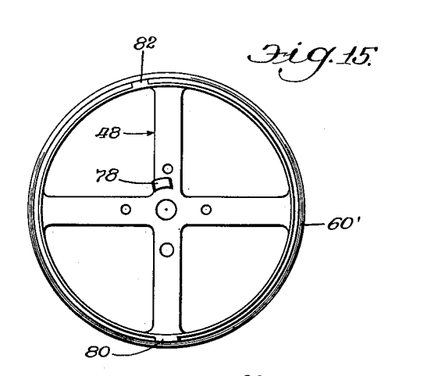
FIG. 15 is a view taken from the left end of FIG. 3, at line 15—15 thereon, with the shaft omitted.
Figure 16:
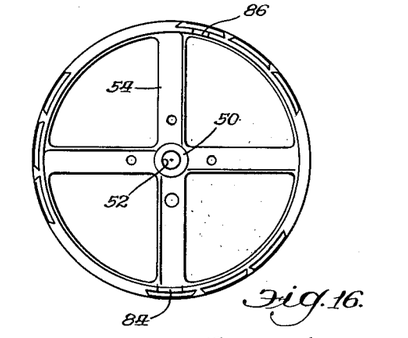
FIG. 16 is an end view of a section of the drum of FIG. 3 from the opposite direction of the view of FIG. 15 taken substantially at the plane of line 16—16 of FIG. 3.
Figure 17:
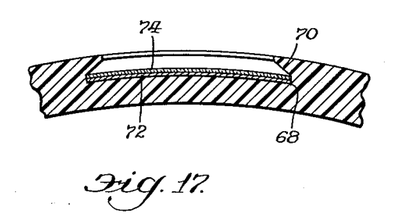
FIG. 17 is a sectional view taken at line 17—17 of FIG. 3.

The drum 34 of FIG. 3 is made up of a plurality of substantially identical sections and a single end piece cooperating with the adjacent section, and a shaft for releasably supporting the sections and end piece thereon. The sections are indicated at 38, the end piece at 40 and the shaft at 42. In view of the substantial identity in construction of the sections 38 a description of one will suffice for all. In producing the desired size of the drum, in the present instance, seven such sections 38 are utilized, as shown clearly in FIGS. 1 and 2. It is to be noted, however, that applicant is not limited to any specific number of sections. Each section 38 is generally cylindrical in shape, of relatively short axial length, and with certain conformations in its outer cylindrical surface, referred to in detail below. Each cylinder includes a cylindrical wall portion 44 (FIGS. 3, 12 and 15) defining an outer main surface 46. At one end this section is provided with a spider 48 having a central hub element 50 defining a bearing opening 52 for reception of the shaft 42, and consequent mounting of the section on the shaft. This spider 48 includes a plurality of radial arms 54, which may be four in number, and is located adjacent one end of the section for simplicity in forming operations and, in the assembly of the sections, together with the spiders of the other section and end piece, for rigidly and firmly supporting all portions of all the sections 38 of the drum. The opposite end of the section, indicated at 56, is unsupported directly by the shaft, but is supported by the adjacent end of the adjacent section, as explained more fully below. The wall 44 of the section therefore is entirely unsupported in the space from the spider 48 to the opposite and free end 56. Each section 38 is provided with an axially extending circumferential rib or bead 58 at the supported end thereof and adjacent the peripheral wall 44. Also in the supported end of the section is a circumferentially inclined surface 60 disposed radially outwardly from the rib or bead 58 forming an axially facing shoulder 62 adjacent to but radially outwardly of the bead 58. The bead 58 and shoulder 62 cooperate in supporting the free end 56 of the adjacent section as shown at the right-hand portion of FIG. 12, while the inclined surface 60 cooperates in retaining program tabs in the adjacent section.

The program tabs mentioned, also known as record tabs in that they identify records, are mounted in recesses indicated at 64. These recesses 64 are provided in number corresponding to the number of record pockets in the record magazine 28. In the present instance the capacity of the phonograph illustrated is 60 records or 120 sides, but the invention is equally applicable to phonographs of other sizes, such for example, as a phonograph having capacity for 100 records or 200 sides, as referred to again hereinbelow. In the present 60 record capacity machine, 60 recesses 64 are provided together with additional recesses 64a which identify groups rather than specific records. The recesses 64 are provided in such size and shape as to accommodate the program tab that is usually provided by record manufacturers, as shown in FIGS. 3, 5 and 6. Usually one such tab is provided for each record and the tab has divided areas or zones bearing the identification of respective sides of the record. The records, in accordance with present custom, are divided into groups representing certain classifications of music, such as "Hit Tunes," "Rhythm and Blues," "Favorites" and others, and the tabs in the program holder are arranged in groups to correspond with this grouping of the records.

Figure 2:
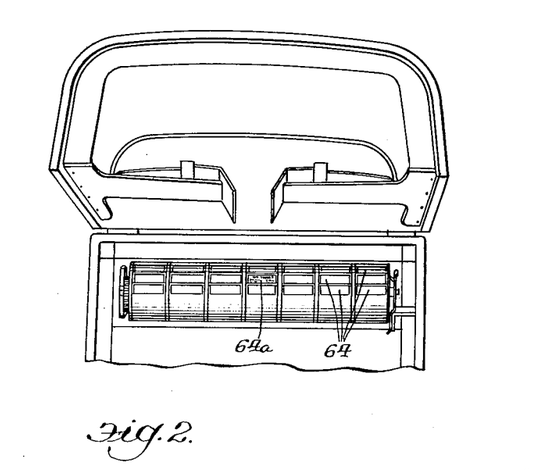
FIG. 2 is a front view of the upper portion of the phonograph of FIG. 1, showing the cabinet in open position and presenting the program holder to front view.

The program holder is arranged for moving the groups of tabs selectively into position for viewing by a user of the phonograph, such as is illustrated in FIGS. 1 and 2. Preferably only those tabs of one group are exposed to view at one time, adjacent ones being shielded from view as shown in FIG. 1, and the position of the record holder, selected for presenting a predetermined group to view, is utilized for controlling the playing of records in the magazine 28, i.e., the making of a selection according to the position of the program holder effects playing of the corresponding record in the corresponding group in the magazine. In the present case three of the groups mentioned above are provided, the sixty records, or one-hundred twenty sides, being such a number as conveniently constitute such a number of groups. Thus, there are three groups of tab-holding recesses, of twenty each, and there is an additional recess, designated 64a, in each group, which is utilized for identifying that group. These twenty-one recesses are further arranged in threes circumferentially, so that each section 38 of the drum contains three recesses of each group, or a total of nine. In the case of the 100-record, or 200-side, capacity phonograph, the records and tabs may conveniently be grouped in five groups, of twenty records, or forty sides, each, and in this case the drum 34 would have a correspondingly greater number of tab-holding recesses; in the case of the size and dimensions of the drum here illustrated, the recesses would form a continuous circumferential series, and each section 38 thereof would have fifteen recesses, instead of nine.

Each recess 64 (and 64a) is in the form of a slot opening axially out through the end 56 of the wall 44 of the section, and defined on its other three sides by undercut retaining surfaces 66 each of which includes an inner surface element 68 generally radial in direction, and an element 70 overhanging the radially outer open side of the recess.

The program tabs shown at 72 and 74 in FIGS. 5 and 6 are inserted in the recess. These tabs are of proper width to frictionally engage the side edge elements 68 which aid in retaining the tabs in position while the overhanging wall elements 70 normally retain the tabs in place against displacement in radial direction.

Figure 12:
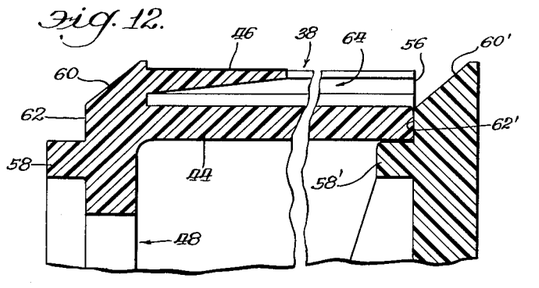
FIG. 12 is a large scale view taken at line 12—12 of FIG. 3.
Figure 13:
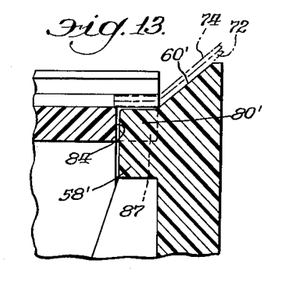
FIG. 13 is a large scale view taken at line 13—13 of FIG. 3.
Figure 14:
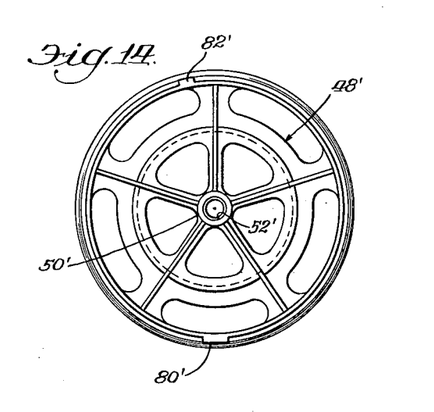
FIG. 14 is an inside end view of the end piece of the drum of FIG. 3, taken substantially at the plane of the line 14—14 of that figure.

As noted above, each section 38 includes only one spider 48 and this is positioned adjacent one end of the section. The opposite and open end of the section is telescoped over the bead 58 on the adjacent section, and preferably snugly fits the bead on that section. The end of the wall element 44 engages the shoulder 62 on that section while the recesses 64 are disposed radially outwardly of that shoulder (FIG. 12). Therefore the inclined surface element 60 is in axial alignment with the recesses, i.e., it has a radial component extending across the recesses. The inclined surface 60 is inclined outwardly and away from the open ends of the recesses so as to provide an opening or space for insertion of the tabs into the recesses, and removal therefrom. To accomplish this operation the tabs are flexed or bent to generally the shape shown in FIG. 13, and slid into or out of the recess, by engaging them with the finger and moving them in the desired direction. When the tabs are fully inserted into the recesses the inclined surface element 60 serves to normally retain the tabs therein in the absence of applied external pressure, but readily permit removal of the tabs in the manner mentioned.

The spider 48 on each section firmly supports that end of the section while the opposite free end 56 thereof is supported by the adjacent section through the medium of the spider on the latter section. Hence the spiders on all the sections, taken together, solidly and firmly support all the sections in perfect axial alignment relative to the shaft 42 on which they are mounted. The single spider on each section facilitates manufacture of the section as compared with multiple spiders, and the placement of that single spider in the end of the section provides greater solidity and support than would be the case if the single spider were placed at other locations in the sections, such as in the middle.

The endmost section 38, i.e., the one to the right in FIG. 3, would have its free end unsupported but for the end piece 40. This end piece includes an inclined peripheral surface 60', a shoulder 62' and a rim or bead 58', similar in shape and corresponding in function to the respective elements designated by corresponding unprimed reference numerals referred to above. The end piece 40 includes a spider 48' generally similar to the spider 48 and a hub element 50' defining a bearing element 52' for receiving the shaft 42 and supporting the end piece thereon. The end piece need be only of such axial dimension as to provide the strength needed to support the otherwise unsupported end of the adjacent section 38.

The several sections 38 and the end piece 40 are assembled in end-to-end relation and in axial alignment on the shaft, and are retained in snug inter-engagement and substantially rigid unitary assembly by suitable means, such as clips 76 engaging the members forming the ends of the drum and fitted in circumferential grooves in the shaft. These clips are removable for enabling dismounting the drum components from the shaft.

Preferably the sections 38 and end piece 40 of the drum are each made as an integral molded piece, preferably of a suitable known plastic material. Various kinds of plastic materials are known that are suitable for this purpose. The provision of only a single spider 48 in each section, referred to above, provides a particularly great advantage in molding operation when such is utilized for forming the sections.

The drum is provided with an axial projection 78 shown in FIG. 3, which engages in a notch 80 (FIG. 8) in a socket member 82 in the supporting means, as will be described more fully hereinbelow. The purpose of the projection 78 and notch 80 is to provide for rotation of the drum pursuant to rotation on the socket member, when the drum is mounted in the supporting means. This projection 78 is preferably an integral extension of the spider 48 and is located radially at such a point as to conveniently cooperate with the socket member 82 which may be of any desired dimensions according to the design of the supporting means. In view of the substantial identity in construction of the several sections 38, as is desired for purposes of complete interchangeability thereof, each of the sections 38 may be provided with a projection 78 so that regardless which one of the sections is selected for positioning at the left-hand end of the drum, as viewed in FIG. 3, that section will have such projection 78 as will fit in the notch 80 in the socket member 82.

The sections 38 and the end piece 40 must, of course, rotate in unison and preferably a mechanical interlock is provided for this purpose. This interlocking connection may assume the form of projections 80 and 82 on one component and grooves 84 and 86 on the corresponding component. Thus the projections 80 and 82 may be formed as embossments from the rim or bead 58 and shoulder 62, and the notches 84 and 86 are formed in the free end 56 of the sections. The matched projections and notches preferably are of respectively different sizes so that the sections may be fitted together in only a single position. The end piece 40 is provided with projections 80' and 82' similar in size and position to the projections 80 and 82 for fitting into the corresponding notches in that section 38 with which it is in engagement.

The recesses 64 may terminate at their ends opposite the free ends of the section at a position spaced from the inclined element 60 on that section so as to leave a space 88 between the ends of the recesses and that inclined element. This space is utilized for positioning of a band 90 of suitable material applied thereto as by glue and bearing indicia such as numerals 92 identifying the different areas or portions of the program tabs corresponding to the respective sides of the records to which they relate. The pockets in the magazine 28 are numbered corresponding to the numbering 92 to facilitate servicing the phonograph in replacing records.

The mounting means 36 shown in FIGS. 4, 8 and 10 is mounted in the cabinet of the phonograph, as noted above, in a semi-permanent installation. This mounting means supports the program holder drum for quick removal thereof by a service man in the servicing of the phonograph, as in changing and replacing records. This mounting means includes a base member 94 which may be in the form of an angle, channel, etc., and extends transversely across the cabinet in the interior thereof, being mounted therein by suitable means such as by screws. Mounted on the base member 94 are two end members extending upright therefrom and having means for supporting the drum and certain other parts. These end members include a first end member 96, having a socket member 98 of suitable construction, and adapted to receive one end of the drum 34 (the right hand end, FIG. 3). This socket member is shaped for receiving the projecting end portion of the shaft 42 in sidewise movement while releasably latching the shaft element therein against displacement in an opposite direction. This socket member may assume any desired detail form, such as that shown in FIG. 7, where the end member 96 has a slot 97 therein, and a spring finger 99 with a hole 101 therein is mounted at one end on the end member, with its other and free end, which is that shown in FIG. 7, disposed with the hole in register with the slot. In mounting the drum the end portion of the shaft 42 is slid sidewise into the slot, flexing the finger 99 and continuing the movement until the shaft enters the hole. It may be released by engaging the end of the spring finger by the hand and moving it outwardly (to the right, FIG. 4) until the shaft portion is released from the hole 101.

The opposite end member designated generally at 100 includes in the construction thereof the socket member 82 (FIG. 7) referred to above. This end member 100 includes a transverse upright plate 102 which rotatably mounts the socket member. The socket member 82 includes a central or hub portion 104 having a conical inner surface 106 for receiving the corresponding end portion of the shaft 42 (left hand end, FIG. 3) in a generally axial or longitudinal direction. The conical surface 106 diverges in direction toward the opposite socket member 96 and at its opposite and converging end it merges into a bearing portion 108 for receiving the end portion of the shaft and supporting the corresponding end of the drum in operative position. The conical surface 106 performs a guiding function for insertion of the shaft element into the bearing portion 108. The bearing portion may merge into an outer enlargement 110.

The socket member 104 is provided with a gear 112 for connection in a driving train referred to below. On the opposite side of the gear 112 is a trunnion portion 114 rotatably supported in an aperture in the end plate 102 defined by a surrounding flange 116. The socket member 104 is retained in position in the end plate by means of a cooperating member 118 disposed on the opposite side of the plate and secured in assembly with the socket member by suitable means such as screws 120. Interlocking conformations such as projections and recesses 122 may be provided for assuring solid and firm engagement between these members for conjoint rotation, and assuring a single predetermined rotational position between the parts for purposes of establishing proper timing relationship referred to below. The member 118 is provided with a cam 124 having a plurality of stop notches 126 (FIG. 10). These stop notches are adapted to receive a cam follower 128 which may be in the form of a roller mounted on the swinging end of one arm 130 of a bell crank lever 132 pivoted on a pin 134 on the end plate 102. Another arm 136 of the bell crank lever serves as means for connection of a tension spring 138, the other end of which is connected to a fixed portion of the frame such as the base member 94. The spring 138 is arranged for biasing the bell crank lever in counter-clockwise direction so as to move the cam follower 128 into engagement with the cam 124 and into a notch 126 when in alignment with the respective notch. The sides of the stop notches 126 are disposed at such angles as to enable the cam follower 128 to be cammed out of the notches upon application of sufficient force on the cam, but to prevent movement of the cam in the absence of such external forces, whereby the cam follower serves to locate the position of the cam and retain it in such position corresponding to the respective notch 126, in the normal operation of the phonograph. It might be here stated that the notches 126 are three in number, corresponding to the number of groups of pockets in the magazine and tabs in the program holder in accordance with the design of the sixty-record capacity machine. In other words the cam follower 128 by engaging in the respective notches 126, serves to locate the cam 124 and therefore the program holder drum 34 in the different positions with the corresponding three groups of program tabs presented to view at the front of the phonograph.

The rotatable socket member 104 and the drum when mounted therein are rotated by the gear 112 through the gear train which includes an idler gear 142 (see FIGS. 8 and 10) suitably mounted on the end plate 102 in mesh with the end gear 112 and a driving gear 144 mounted on a shaft 146 which is rotatably mounted in the end plate 102. The gear 144 is fixed to this shaft for rotation therewith and the shaft is driven by an electric motor indicated in its entirety at 148 and mounted by suitable means such as an upright 150 secured to the base member 94. The motor 148 is connected through a speed reduction gearing 152 having an output shaft 154 connected with the shaft 146. The latter connection may assume any convenient form such, for example, as a slot 156 in the shaft 146 and a pin 158 in the shaft 154.

Mounted on the shaft 146 for rotation therewith are a plurality of cams including a main cam 160 and three auxiliary cams 162, 164, 166, the latter three auxiliary cams corresponding to the three groups of records in the magazine and the three groups of identifying program tabs in the program holder. The main cam 160 is provided with three dwells 168 (FIG. 10) into which a cam follower 170 is adapted to drop, successively, upon rotation of the cam. Upon the cam follower dropping into one of these dwells, a switch 172 controlled by the cam follower, opens. This switch together with the cam and cam follower are shown diagrammatically in the circuit of FIG. 18 (top center).

The cams 162, 164, and 166, (which may be formed integral with the cam 160) each include one high point designated by 162a, 164a and 166a, respectively. Associated with the cams 162, 164 and 166 are switches 174, 176 and 178, respectively, one of which, 174, is shown in FIG. 11. These switches are provided with cam followers 174a, 176a, and 178a respectively which engage and follow the corresponding cams. The switches are opened when the followers engage the high points of the cams and are closed when the followers drop into the dwells of the cams. The high points are staggered around the axis of the shaft 146, each constituting an angular distance less than but approximating one-third the circumference of the cam. These cams and the corresponding switches are shown diagrammatically in the circuit of FIG. 18 (upper left).

The drum shown in its entirety in FIGS. 1, 2, and 3 is mounted in the mounting means of FIGS. 4, 8 and 10 by first inserting the left-hand end of the shaft 42 into the socket member 82 in axial direction and then inserting the opposite end, as explained, and as again referred to below. The socket member 82 is engaged by the spider 48 of the adjacent end section of the drum and the drum is thereby limited in axial movement into such position. In this inserting operation the projection 78 on the end section of the drum is fitted in the notch 80 (FIG. 8) of the socket member 82 for producing rotation of the drum pursuant to rotation of the socket member. With the drum poised in this position the opposite end portion of the shaft 42 is swung into the opposite socket member 96 in sidewide motion, as described above, being latched therein in proper position in axial alignment with the opposite socket member. The drum thus can be positioned in only a single predetermined position by reason of the projection 84 and notch 80, angularly of the axis of the drum and socket member, with respect to the socket member. This position is also a certain predetermined position relative to the cams 160, 162, 164 and 166, which control the corresponding switches 174, 176 and 178 in accordance with certain arrangement in the electrical circuit shown in FIG. 18 and described hereinbelow. Moreover, the cam 124 can be positioned only in the single predetermined position relative to the socket member 104 by virtue of the projection and recess 122. This cam is located in any of three different positions corresponding to the stop notches 126 in accordance with predetermined timed relation to the cams 160, 162, 164 and 166, so that when the cam 124 is retained in any given position by the cam follower 128, all of the other elements related thereto in predetermined timed relation assume their proper positions with respect to the operation of all of the operating parts of the phonograph as controlled by and through the electrical circuit of FIG. 18.

The phonograph is provided with two series of control keys, one series designated generally 180, and the other designated generally 182 (see particularly FIGS. 1 and 18), both exposed to the exterior and positioned for actuation by the one playing the phonograph. The keys 180 correspond with the record groups mentioned, and specifically are designated 180a, 180b, and 180c, and may be termed group keys.

The individual-selection keys 182 in the present instance are forty in number and correspond to the total number of sides of the records included in any one group. These individual keys 182 are shown elliptically, only four being shown, in the circuit of FIG. 18 (right center). The keys are designated 1, 20, 21 and 40, respectively, those numbered 1 and 20 representing the first and last of twenty of the keys, while those numbered 21 and 40 represent the first and last of the second twenty.

Figure 18:
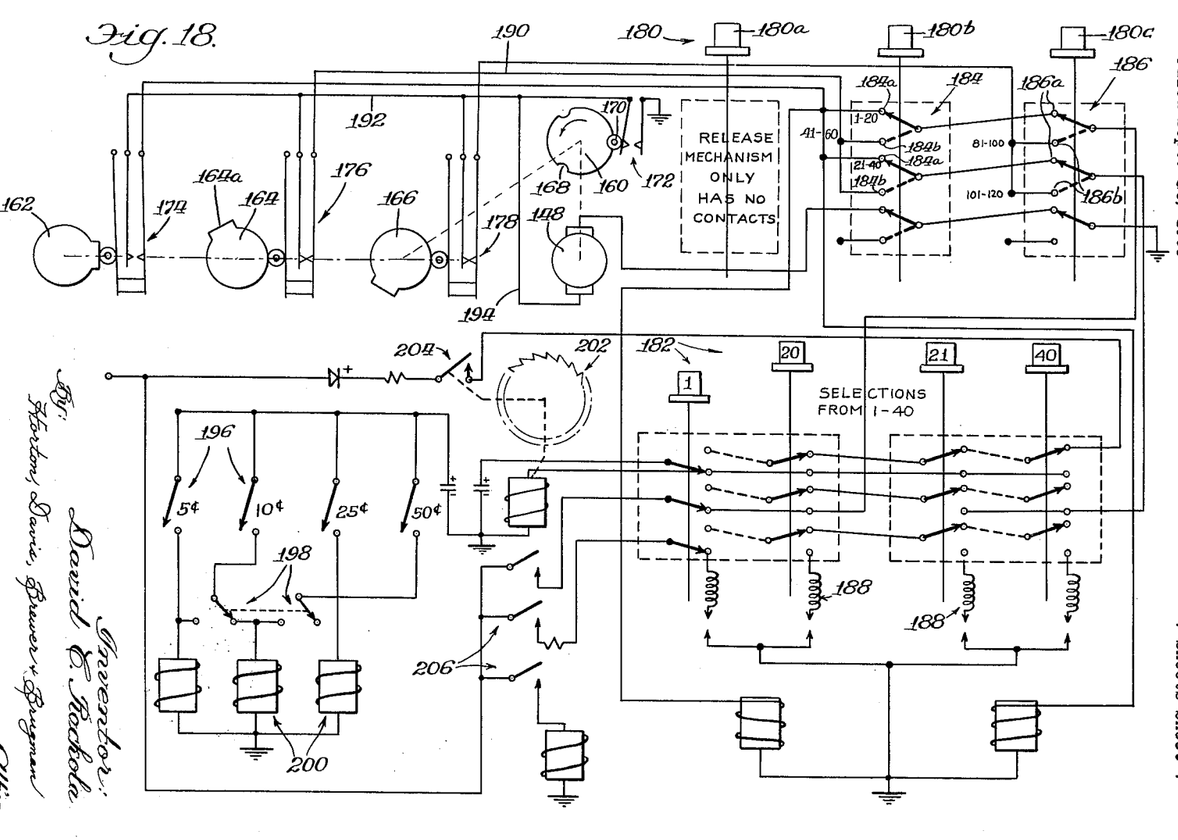
FIG. 18 is a diagram of the electric circuit for controlling the program holder and related parts.

The circuit diagram of FIG. 18 shows the portion of the circuit for selection of the individual recordings, or record sides, and the control circuit for the program holder. The three groups of record sides, referred to above, are controlled by circuit portions which in turn are controlled by the cam means 162, 164 and 166. The forty individual-selection keys 182 are related to one each of the three groups of record sides, as controlled by the positions of the program holder.

The group keys 180b and 180c control sets or gangs of switches 184 and 186, respectively, and through contacts 184a and 186a, respectively, control selector coils for the record sides of the related groups. These selector coils are shown diagrammatically at 188, and, according to which of the keys 180 are depressed, the selector coils related to the record sides in the associated group are in circuit for energization. The selector coils are embodied in a selector drum 190 (FIG. 1), details of which may be found in my previously issued patent referred to above. Briefly, the selector drum 190 contains a selector element or lever associated with each side of each record in the magazine. The position of the program holder determines which one of these selector elements is actuated in response to actuation of one of the keys 182, and the magazine in rotating in the selection operation, as it does, moves a selector carriage with it and the latter encounters the selector element actuated, and as a result the magazine stops at a position corresponding to the selector element actuated. The record playing mechanism then comes into operation and plays the selected record side. When the switches 184 and 186 are in their full line positions of FIG. 18 and in engagement with the contacts 184a and 186a, respectively, the circuit is set up for a first group which is represented by the key 180a. When the switches 184 are in engagement with the opposite contacts 184b, a second group is selected represented by the key 180b, and, similarly, when the switches 186 are in engagement with the contacts 186b, a third group is selected. The group key 180a operates merely a release mechanism upon actuation of which the switches 184 and 186 move to their full line position, if they were not at that time in that position, and in the event either of the keys 180b and 180c is depressed the respective switches 184 or 186 are moved to their dotted line position. The individual ones of the forty selection keys 182 are related to the forty record sides of the group selected, so that a total of forty individual keys serve to make selections of the total of 120 record sides. In the case of a 100-record, or 200-side, capacity phonograph in which the records and various other members are contained in five groups, instead of three, there will of course be five group keys 180 and related switches, and five cams, such as 162, 164, 166, and related switches.

The program holder is arranged for automatic shifting to the selected position in response to actuation of the group keys 180, in the operation of which the individual keys 182 are placed in the particular group circuits. Depression of the group keys 180 energizes, or controls the energization of, the program motor 148 for setting the program holder to the position represented by the group key depressed. Except for the condition in which the program holder is already in the position represented by the particular group key depressed, the program holder moves to the respective position from any other position in which it happens to be reposing at that time. For example, the program holder is in a position which may be considered the "first position" in which the cam 162 is in position for holding the corresponding switch 174 open (FIG. 18). This position is that represented by depression of the group key 180a and the corresponding retracted positions of the keys 180b and 180c with the related switches in the full line position. Assume next that it is desired to select the group represented by the key 180b or the "Rhythm and Blues" group—current is transmitted through the switches 184 in their dotted line position and conductor 190 and then through switch 176 corresponding to this group. This switch being closed completes circuit to conductor 192 and then to conductor 194 to the motor 148. The motor then operates and as shown diagrammatically in FIG. 18, and as explained above, rotates cam 164 (as well as the other cams) until the high point 164a opens the corresponding switch 176. The high point 164a is relatively broad and serves to break the circuit set up to the motor as described, but another circuit is maintained to the motor by the cam 160. The high point of the cam 160 retains the switch 172 closed and thus maintains a circuit to the motor through conductors 192 and 194, but upon the cam follower 170 falling into a dwell 168 the switch 172 opens and both circuits to the motor are opened and the motor stops. At this position the program holder is in the selected position. The cam 164 acts as a coarse selecting action while the cam 160 operates as a fine control for stopping the motor so as to accurately position the program holder in the intended position. The three notches in the cam 160 correspond to the three groups and are related to the corresponding cams 162, 164 and 166. At the same time that the cam follower 170 falls into the dwell, the cam follower 128 falls into the corresponding notch 126 and frictionally retains the drum and cams, and other movable parts in that position in which they stop. A similar action takes place when either of the group keys 180a and 180c are actuated, as that just described.

At the lower left-hand portion of the circuit of FIG. 18 is shown diagrammatically switches 196 which represent coin insert means. The coin insert means and the switches controlled thereby may be conventional, and in response to the insertion of a coin one or another of the switches 196 is closed. It is believed unnecessary to describe the details of construction of such coin insert means. Additional switches 198 serving as price option switches are provided for selectively setting up circuit for control by coins of different denominations; this switch arrangement is shown and claimed in my co-pending application, Serial No. 849,546, filed Oct. 29, 1959. In response to insertion of a coin and corresponding closing of the related switch 196 one of the escapement ratchet wheel coils 200 is actuated and this operation results in actuation of a master accumulator ratchet 202 which performs certain functions, one of which is closure of a master control switch 204. Upon insertion of the coin as mentioned, and actuation of the desired individual control keys 182, these operations performing one or more functions relating to a series of switches 206, the phonograph is set in operation and it continues operating until it plays that number of selections represented by the coin inserted and the control keys actuated, and more specifically, as controlled by the dissipation of the credit accumulated on the ratchet 102.

It is preferred that the program tabs of FIGS. 5 and 6 each be made up of two elements superimposed in a stack, the upper one of which is transparent in order to facilitate changes therein. These elements include a lower element 72 having inscriptions thereon such for example as the price of plays. The upper element 74 is transparent but having also inscriptions thereon such as the designation of the group. The inscriptions on the two tab elements are relatively offset and produce a composite inscription when the elements are superimposed. This arrangement enables replacement of the lower tab element, for example, in accordance with changes in prices without necessitating changing the upper element.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the forms hereinbefore described being merely preferred embodiments thereof.

I claim:

1. Program holder means comprising a drum including a cylindrical member and a shaft having end portions projecting beyond the ends of the cylindrical member, means for demountably receiving and supporting the drum including opposed axially aligned socket members for receiving and releasably securing said end portions of the shaft, at least one socket member being rotatable and that socket member and the corresponding end of the drum having elements interlockingly engageable by relative axial movement for producing rotation of the drum upon rotation of that socket member and predetermining a single angular position of the drum relative to the socket member, and means for rotating the rotatable socket member.

2. Program holder means comprising a drum including a cylindrical member and a shaft having end portions projecting beyond the ends of the cylindrical member, means for demountably receiving and supporting the drum including opposed axially aligned socket members for receiving said end portions, one of said socket members having an opening for receiving the corresponding end portion of the shaft in transverse direction and latch means for engaging and releasably retaining the end portion in the socket member, the opposite socket member having an opening for receiving the corresponding end portion of the shaft in axial direction and retaining it therein against displacement in transverse direction, said opposite socket member and the corresponding end of the drum having elements interlockingly engageable by relative axial movement for producing rotation of the drum in response to rotation of the socket member and predetermining a single angular position of the drum relative to the socket member, and means for rotating the socket member.

3. Program holder means for incorporation in a cabinet having opposed side walls and a front, comprising an integrated frame structure including a longitudinal transverse member and end members extending upright from the ends thereof, said frame structure being adapted to be mounted in the cabinet with the transverse member extending transversely of the cabinet and the end members disposed at the side walls of the cabinet, a socket member in each end member, a drum including a cylindrical member and shaft portion projecting beyond the ends of the cylindrical member, said socket members being adapted to detachably receive said shaft portions and support the drum thereby for free demountability of the drum, one of said socket members being rotatable and that socket member and the drum having interlocking elements for producing rotation of the drum in response to rotation of that socket member, and motor and drive means for rotating said rotatable socket member.

4. Program holder means comprising an integrated frame structure adapted for mounting in a cabinet, a pair of opposed axially aligned socket members in the frame structure, one of the socket members being rotatable and having an inner end facing the other socket member, said inner end having a conical inner surface converging toward a smaller bearing opening adjacent its outer end, said inner end having a notch in its wall, a drum including a cylindrical member and shaft portions projecting beyond the ends of the cylindrical member, said conical surface being adapted to receive one of said shaft portions in generally axial direction and aid in guiding it into said bearing portion, and the other socket member being adapted to receive the other shaft portion in a transverse direction and including latch means releasably engaging the corresponding shaft portion and releasably retaining it against transverse movement out of the socket, said drum having a projection insertable into said notch for producing rotation of the drum in response to rotation of the rotatable socket member and predetermining a single position of the drum angularly relative to the socket, and means for rotating the rotatable socket.

5. A program holder comprising a plurality of substantially identical sections each of which is cylindrical in shape and has means on the cylindrical surface for receiving and releasably supporting program tabs, a shaft, said sections being mounted on said shaft in axial alignment and end-to-end abutting relationship and each engaging the shaft at only one end thereof, and means on said shaft retaining said sections in rigid unitary assembly forming a relatively elongated cylindrical member, said shaft being longer than the assembly of sections and forming end portions projecting beyond the ends thereof for forming means for mounting the assembly.

6. A program holder comprising a drum made up of a cylindrical member and a shaft, said cylindrical member including a plurality of substantially identical cylindrical sections mounted on the shaft in axial alignment and in end-to-end abutting engagement, each section having a spider at one end only having a bearing receiving the shaft, and mounting the section on the shaft, said sections being oriented all in the same manner with the ends having the spiders directed in the same direction, the end of each section, except a first section at one end of the assembly, having the spider engaging an opposite end of an adjacent section serving to support said opposite end in accurate axial relation to said shaft, and end member supporting the unspidered end of the last section at the end of the assembly opposite said first section, and means securing said sections together in rigid and unitary assembly, said shaft projecting beyond the ends of the assembly of sections forming means for mounting the assembly.

7. Program holder means comprising a drum member having a plurality of means for holding program tabs on its outer cylindrical surface, each tab holding means including a recess having all sides but one defined by undercut bounding surfaces, and the said one side formed by an inclined surface having a component of direction across the depth direction of the recess and inclined away from the floor of the recess, and spaced from the ends of the adjacent undercut bounding surfaces whereby to enable insertion of a tab into and removal thereof from the recess in directions generally parallel with said adjacent bounding surfaces.

8. Program holder means comprising a cylindrical member including a plurality of substantially identical cylindrical sections assembled in axial alignment and end-to-end rigid assembly, each section having a plurality of means for holding program tabs on its outer cylindrical surface, each said tab holding means including a recess opening axially through an end of the section and all other sides defined by undercut bounding surfaces, each section but a first section engaging an adjacent section at the said end thereof and serving as means for releasably retaining tabs in those recesses opening through that end, and means engaging the last of the sections at the end of the assembly opposite said first section for releasably retaining tabs in the recesses in said last section.

9. Program holder means comprising a shaft, a cylindrical member mounted on said shaft and including a plurality of substantially identical sections mounted in end-to-end, axially aligned rigid assembly, each section having a spider adjacent one end with a bearing portion receiving the shaft and supporting the section thereon, and the opposite end of each section being free of support, each section having a plurality of means for holding program tabs on its outer cylindrical surface, each tab holding means including a recess opening axially through said opposite end and defined on all other sides by undercut surfaces, each section but a first section at its end having the spider engaging an adjacent section at the said opposite end of the latter and acting to support said opposite end in axially aligned position, means engaging the last section at the said opposite end and supporting it in axially aligned position, each section at its spider end and said last means having a circumferential element inclined to the axis of the shaft and forming a bounding surface to the recesses in the respective adjacent sections, said inclined surface having a component of direction extending across the open ends of recesses in the depth directions thereof for normally but releasably retaining tabs in the recesses but being spaced from the respective sections sufficiently to enable insertion of a tab into and its removal from the recesses in directions generally parallel with the axis of said shaft.

10. Program holder means comprising a shaft and a cylindrical member mounted on the shaft, the shaft having end portions projecting beyond the ends of the cylindrical member for mounting the holder means for rotation about the axis of the shaft, said cylindrical member being made up of a plurality of substantially identical sections and an end piece all of which are molded articles, each section being cylindrical in shape and having a spider at one end with a hub element therein defining a bearing receiving the shaft and thereby supporting the section on the shaft, the remainder of the section throughout its length being in the form of a cylindrical wall without internal structure, and without engagement with or support directly by the shaft, said sections comprising a first and successive sections and the sections and end piece being assembled in end-to-end abutting relation, means detachably secured to the shaft for releasably securing the sections and end piece in rigid assembly, each section other than said first section, engaging at its spider end the free and otherwise unsupported end of the respective adjacent section and thereby retaining it in axial alignment, and the end piece similarly engaging the free end of the section next to it and supporting it in axial alignment, said section and end piece having interlocking elements for predetermining a relative position thereof angularly about the shaft, each section having on its spider in axially outwardly extending direction a projection whereby that projection on said first section is adapted for engagement with a corresponding element on a mounting means whereby to produce rotation of the cylindrical member upon rotation of the mounting means, each section having a plurality of means for mounting record tabs on its outer cylindrical surface, each tab mounting means including a recess opening through the free end of the section and being bounded on all other sides by undercut surfaces, each section having adjacent its spider end and the end piece having a circumferential surface inclined at all diameters to the axis of the shaft and having a radial component projecting across the open end of the recesses of the respective adjacent sections but spaced therefrom whereby to enable insertion of tabs into and removal thereof from the recesses in directions generally parallel with the axis of the shaft, said circumferential inclined surfaces being operative for normally but releasably retaining tabs in the recesses.

11. In an automatic phonograph, a magazine having a predetermined number of record receiving pockets and movable for selectively placing said pockets at an indexing position, a turntable, means for transferring a record between a magazine pocket at said indexing position, and said turntable, means for operating said magazine, turntable and transferring means, circuit means, means for controlling said operating means, a program holder having means for holding tabs bearing indicia for each of the pockets of the magazine, said tab holding means being arranged in at least three groups and all together constituting a predetermined number corresponding to the number of record pockets in the magazine, said program holder being movable for selectively presenting said groups of tab holding means in a viewing position, means for so moving said program holder, circuit means for controlling said moving means, and manually actuated means for controlling said circuit means, said manually actuated means including elements related to different ones of said groups and operable upon actuation of selected ones of said elements for so controlling the circuit means as to actuate the moving means to move the program holder for presenting the respective groups to view, a plurality of selection elements corresponding in number to the tabs of a group, secound circuit means including elements related to individual tabs, and means controlled by the position of said program holder for energizing those of the second circuit elements related to tabs in the group presented to view, said last means being also operable for controlling said operating means for moving the magazine for placing in indexing position a pocket related to a tab in the viewing position.

12. The invention set out in claim 11 in which said manually actuated means includes first means operable upon actuation thereof for effecting movement of said program holder to position for presenting a predetermined group of tab holders to view and second means operable upon actuation thereof for effecting selection of a predetermined record corresponding to a tab holder of that group that is then presented to view, removing that record from the magazine, playing it, and returning to the magazine.

13. The invention set out in claim 12 in which the first means includes a different key corresponding to each of said groups and operable upon actuation thereof for effecting movement of the program holder for presenting the corresponding group to view, and the second means includes a plurality of keys corresponding in number with the tab holders in each group thereof, and each key being related to a predetermined tab holder of each group, in the program holder, and each key being operable upon actuation thereof for effecting the functions stated with respect to that record in the magazine pocket corresponding to the tab holder related thereto in the group then presented to view.

14. The invention set out in claim 11 wherein said preselected group is presented to view in response to a single actuation of the corresponding manually actuated means regardless of the position assumed by the program holder at the time of actuation of that manually actuated means.

15. The invention set out in claim 14 wherein said program holder is rotated, in response to actuation of the manually actuated means mentioned, for successively presenting the different groups to view from the position then assumed by the program holder until the selected position is reached, except when said assumed position is the one represented by the manually actuated means that was actuated.

References Cited in the file of this patent

UNITED STATES PATENTS

| | | |
|---|---|---|
| 2,324,908 | Collison et al. | July 20, 1943 |
| 2,443,925 | Osborne | June 22, 1948 |
| 2,624,140 | Neilson | Jan. 6, 1953 |
| 2,856,714 | Bruner | Oct. 21, 1958 |
| 2,906,538 | Rockola | Sept. 29, 1959 |
| 2,952,930 | Hartle et al. | Sept. 20, 1960 |